United States Patent
Zhang et al.

(10) Patent No.: US 10,244,485 B2
(45) Date of Patent: Mar. 26, 2019

(54) TRANSMIT POWER CONTROL METHOD, DEVICE, AND WIRELESS CONTROLLER

(71) Applicant: HUAWEI TECHNOLOGIES CO., LTD., Shenzhen, Guangdong (CN)

(72) Inventors: Wei Zhang, Nanjing (CN); Peng Zhen, Dubai (AE); Xingfeng Jiang, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/845,869

(22) Filed: Dec. 18, 2017

(65) Prior Publication Data
US 2018/0176868 A1   Jun. 21, 2018

(30) Foreign Application Priority Data
Dec. 20, 2016   (CN) .......................... 2016 1 1186669

(51) Int. Cl.
| | |
|---|---|
| H04W 52/24 | (2009.01) |
| H04B 17/309 | (2015.01) |
| H04W 4/06 | (2009.01) |
| H04W 52/12 | (2009.01) |
| H04W 52/32 | (2009.01) |
| H04B 17/318 | (2015.01) |

(52) U.S. Cl.
CPC ........ *H04W 52/242* (2013.01); *H04B 17/309* (2015.01); *H04B 17/318* (2015.01); *H04W 4/06* (2013.01); *H04W 52/12* (2013.01); *H04W 52/327* (2013.01)

(58) Field of Classification Search
CPC ............. H04W 52/242; H04W 52/146; H04W 52/247; H04W 52/383; H04W 52/10; H04W 52/283; H04W 52/12; H04W 52/327; H04W 52/38
See application file for complete search history.

(56) References Cited

U.S. PATENT DOCUMENTS

| | | | |
|---|---|---|---|
| 2008/0055068 A1 | 3/2008 | Van Wageningen et al. | |
| 2008/0182607 A1* | 7/2008 | Behroozi ............ | H04W 52/242 455/522 |

FOREIGN PATENT DOCUMENTS

EP    2858398 A1    4/2015

OTHER PUBLICATIONS

Extended European Search Report issued in European Application No. 17208471.7 dated Apr. 24, 2018, 9 pages.

* cited by examiner

*Primary Examiner* — Keith Ferguson
(74) *Attorney, Agent, or Firm* — Fish & Richardson P.C.

(57) ABSTRACT

A transmit power control method is disclosed. An example method includes obtaining a path loss between a to-be-adjusted wireless device and each of multiple wireless devices. A transmit power of the to-be-adjusted wireless device is adjusted according to a neighbor path loss and a target power. The neighbor path loss is a function of a neighbor path loss set. The neighbor path loss set is a set of path losses of a neighbor wireless device set. The neighbor wireless device set is a set of at least two wireless devices among the multiple wireless devices, where path losses between the at least two wireless devices and the to-be-adjusted wireless device are lowest. A layer closest to the to-be-adjusted wireless device is used as a reference to adjust the transmit power, and interference between wireless devices is reduced.

18 Claims, 3 Drawing Sheets

TRANSMIT POWER CONTROL METHOD, DEVICE, AND WIRELESS CONTROLLER

CROSS-REFERENCE TO RELATED APPLICATION

This application claims priority to Chinese Patent Application No. 201611186669.X, filed on Dec. 20, 2016, which is hereby incorporated by reference in its entirety.

TECHNICAL FIELD

This application relates to the field of communications, and in particular, to a transmit power control method, a device, and a wireless controller.

BACKGROUND

A wireless local area network (WLAN) may include multiple access points (AP). To reduce interference between APs while ensuring a complete coverage area of a wireless signal of an AP, a power of each AP needs to be controlled properly.

SUMMARY

This application provides a transmit power control method and a device, so as to control a transmit power of a wireless device, and reduce interference between wireless devices while ensuring a complete coverage area of a wireless signal.

According to a first aspect, a transmit power control method is provided, including: obtaining a path loss between a to-be-adjusted wireless device and each of multiple wireless devices; and adjusting a transmit power of the to-be-adjusted wireless device according to a neighbor path loss and a target power. The transmit power of the to-be-adjusted wireless device is, after attenuating according to the neighbor path loss, the target power. The neighbor path loss is a function of a neighbor path loss set. The neighbor path loss set is a set of path losses between the to-be-adjusted wireless device and wireless devices in a neighbor wireless device set. The neighbor wireless device set is a set of at least two wireless devices among the multiple wireless devices, where path losses between the at least two wireless devices and the to-be-adjusted wireless device are lowest. A difference between any two closest path losses other than a lowest path loss in the neighbor path loss set is less than or equal to a first threshold.

The first threshold is used to "layer" wireless devices other than the to-be-adjusted wireless device. Wireless devices with close path losses belong to a same layer. A layer of wireless devices closest to the to-be-adjusted wireless device are neighbor wireless devices of the to-be-adjusted wireless device. A set of the neighbor wireless devices is a neighbor wireless device set. A closest layer of neighbor wireless devices are used as a reference, to adjust the transmit power of the to-be-adjusted wireless device, and interference between wireless devices is reduced while ensuring a complete coverage area of a wireless signal.

With reference to the first aspect, in a first implementation of the first aspect, that the neighbor path loss is a function of a neighbor path loss set includes: the neighbor path loss is an average of path losses in the neighbor path loss set; or the neighbor path loss is a median of path losses in the neighbor path loss set.

With reference to the first aspect or the first implementation of the first aspect, in a second implementation of the first aspect, the method further includes: checking, according to ascending order of path losses of the multiple wireless devices, whether a stop condition is satisfied, adding a to-be-checked path loss into the neighbor path loss set, and stopping checking a next path loss when the stop condition is satisfied. The stop condition includes: a quantity of elements in the neighbor path loss set is two or more, and a difference between the to-be-checked path loss and an unchecked lowest path loss is greater than the first threshold; or a quantity of elements in the neighbor path loss set is equal to a second threshold.

According to a second aspect, a transmit power control device is provided. The transmit power control device includes a module for performing the method in the first aspect or any implementation of the first aspect.

According to a third aspect, a wireless controller is provided. The wireless controller includes a processor and a physical interface. The processor is configured to perform the method in the first aspect or any implementation of the first aspect.

According to a fourth aspect, a wireless device is provided. The wireless device includes a processor and a wireless physical interface. The processor is configured to perform the method in the first aspect or any implementation of the first aspect.

According to a fifth aspect, a computer-readable medium is provided. The computer-readable medium stores a computer-executable program for selecting a forwarding path. The program includes an instruction for performing the method in the first aspect or any implementation of the first aspect.

DESCRIPTION OF EMBODIMENTS

The following describes embodiments of the present invention with reference to FIG. 1 to FIG. 5.

Figure 1:
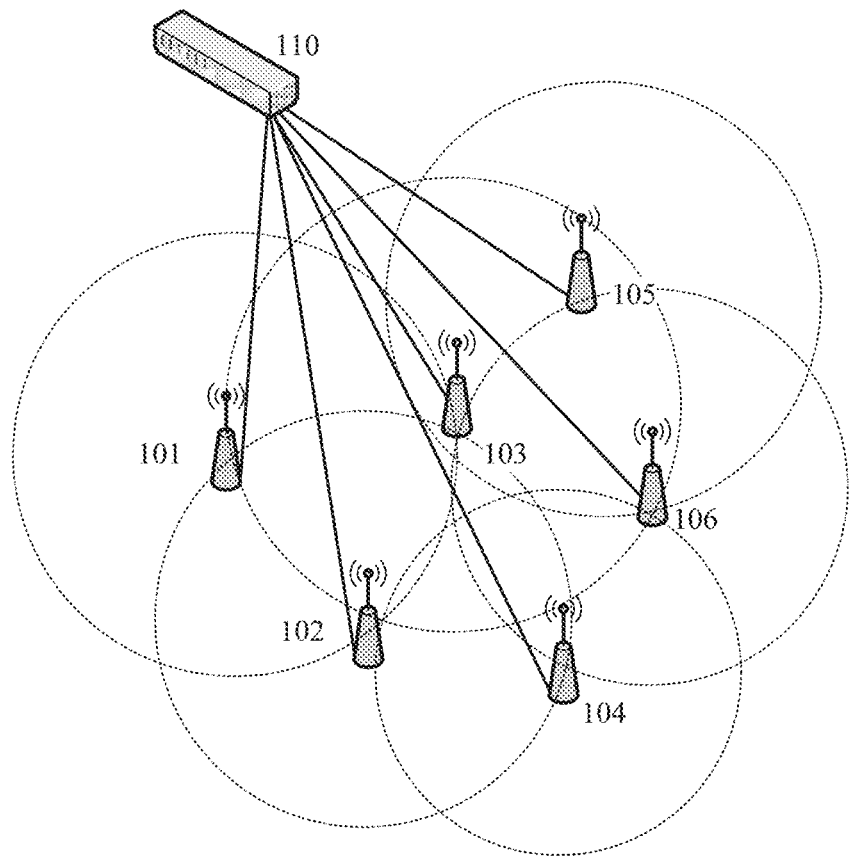
FIG. 1 is a schematic diagram of a network architecture according to an embodiment of the present invention.

FIG. 1 is a schematic diagram of a network architecture according to an embodiment of the present invention.

In FIG. 1, there are six wireless devices, that is, a wireless device 101 to a wireless device 106. The wireless device may be an AP in a WLAN, a base station in a cellular mobile network, a Bluetooth base station, or the like. A dotted circular area that is centered at each wireless device is a coverage range of each wireless device. Optionally, the network architecture further includes a wireless controller 110. The wireless controller 110 is connected to each wireless device. The wireless controller 110 may be connected to any wireless device directly or through one or more network devices (for example, a router or a network switch). The wireless controller 110 may be a server or a network device.

In this embodiment of the present invention, the wireless device itself or the wireless controller 110 adjusts a transmit power for the wireless device.

Figure 2:
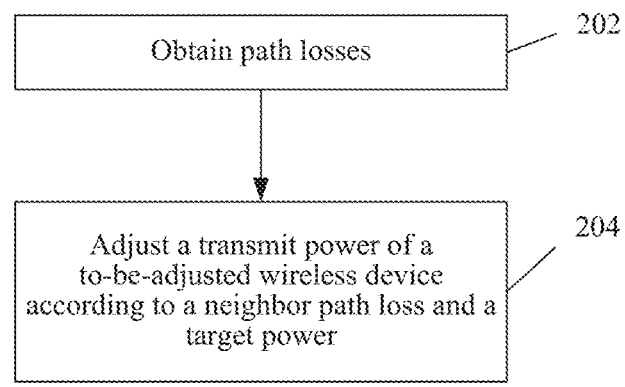
FIG. 2 is a flowchart of transmit power control according to an embodiment of the present invention.

FIG. 2 is a flowchart of transmit power control according to an embodiment of the present invention.

202. A wireless controller or a to-be-adjusted wireless device obtains a path loss between the to-be-adjusted wireless device and each of multiple wireless devices. When the to-be-adjusted wireless device adjusts a transmit power or the wireless controller adjusts a transmit power for the to-be-adjusted wireless device, path losses between the to-be-adjusted wireless device and other wireless devices are used as a reference.

The path loss, also referred to as path attenuation, is reduction in power density of an electromagnetic wave as the electromagnetic wave propagates through space. A wireless device transmits a signal at a transmit power, and the to-be-adjusted wireless device receives the signal and measures the signal to obtain a received power of the signal. The to-be-adjusted wireless device or the wireless controller obtains the transmit power and the received power to obtain a power loss between the wireless device and the to-be-adjusted wireless device. Unless otherwise specified below, a path loss of a wireless device means a path loss between the wireless device and a to-be-adjusted wireless device.

The wireless controller may collect a received power of each measured signal from all wireless devices. If multiple wireless devices transmit a measured signal at a same transmit power, the transmit power may be a default value. If multiple wireless devices transmit a measured signal at different transmit powers, the wireless controller may collect the transmit power of each measured signal from all wireless devices.

The to-be-adjusted wireless device itself measures the signal to obtain the received power of the measured signal. If multiple wireless devices transmit the measured signal at a same transmit power, the transmit power may be a default value. If multiple wireless devices transmit the measured signal at different transmit powers, the to-be-adjusted wireless device may collect the transmit power of each measured signal from all wireless devices. For example, the to-be-adjusted wireless device may send a request to a sender of the signal to obtain the transmit power of the signal, or content of the signal includes the transmit power of the sender.

The multiple wireless devices are wireless devices, between which and the to-be-adjusted wireless device, path losses can be obtained. Using a WLAN as an example, neighboring APs generally operate on different channels. However, to improve measurement precision, two APs that respectively transmit and receive a signal are adjusted to operate on a same channel, so as to accurately measure the path loss. For example, the to-be-adjusted wireless device may scan channels successively to attempt to receive to-be-measured signals of different operating channels.

The received power or a received signal strength is not only related to spatial environmental factors such as a distance between wireless devices and existence or absence of an obstacle, but also is related to the transmit power. Therefore, it is not accurate enough to directly use the received power or the received signal strength as a reference to adjust the transmit power. Therefore, the path loss is introduced in this application as a reference factor for controlling the transmit power. However, if before transmit power adjustment, that is, at a path loss measurement stage, the wireless devices transmit measured signals at a same transmit power, products of losses of paths between any two wireless devices and received powers or received signal strengths of the measured signals propagating along the paths are the same (if a logarithm such as dB (dB) or dBm (dBm) is used as a unit, sums of the path losses and the received powers or the received signal strengths are the same). Therefore, if all wireless devices transmit a measured signal at a same transmit power, using a path loss as a reference is equivalent to using a received power or a received signal strength as a reference.

204. The wireless controller or the to-be-adjusted wireless device adjusts a transmit power of the to-be-adjusted wireless device according to a neighbor path loss and a target power. The transmit power of the to-be-adjusted wireless device is, after attenuating according to the neighbor path loss, the target power. The neighbor path loss is a function of a neighbor path loss set. For example, the neighbor path loss is an average or a median of path losses in the neighbor path loss set.

If the to-be-adjusted wireless device determines its own transmit power, the to-be-adjusted wireless device directly adjusts its own transmit power. If the wireless controller determines the transmit power of the to-be-adjusted wireless device, the wireless controller instructs the to-be-adjusted wireless device to perform adjustment according to the transmit power.

The neighbor path loss set is a set of path losses between the to-be-adjusted wireless device and wireless devices in a neighbor wireless device set. The neighbor wireless device set is a set of at least two wireless devices among the multiple wireless devices, where path losses between the at least two wireless devices and the to-be-adjusted wireless device are lowest, and a difference between any two closest path losses other than a lowest path loss in the neighbor path loss set is less than or equal to a first threshold. The first threshold is used to "layer" wireless devices other than the to-be-adjusted wireless device. Wireless devices with close path losses belong to a same layer. A layer of wireless devices closest to the to-be-adjusted wireless device are neighbor wireless devices of the to-be-adjusted wireless device. A set of the neighbor wireless devices is a neighbor wireless device set. For example, the first threshold is 6 dB (dB). In addition, an upper limit and/or a lower limit may be set for a quantity of wireless devices in the neighbor wireless device set. For example, because a quantity of the layer of wireless devices closest to the to-be-adjusted wireless device is generally not less than two and not greater than six, the quantity of wireless devices in the neighbor wireless device set may be set to two at least and six at most. If such a setting is made, and a quantity of measured path losses exceeds six, the neighbor path loss set may be one of the following: a set of two lowest path losses in multiple path losses, a set of three lowest path losses in multiple path losses, a set of four lowest path losses in multiple path losses, a set of five lowest path losses in multiple path losses, or a set of six lowest path losses in multiple path losses.

Because all values in a computer are discrete, whether a difference between path losses is less than or equal to the first threshold may be determined based on whether the difference between path losses is less than or equal to the first threshold or the difference between path losses is less than another threshold. The another threshold is another discrete value greater than the first threshold, and no other discrete value exists between the discrete value and the first threshold.

The target power is a power when a signal transmitted by the to-be-adjusted wireless device at the adjusted transmit power arrives at a location that is related to the neighbor wireless device set. The target power is set according to a power that does not interfere with operating of a neighbor wireless device. A proper target power may be set, so that a signal transmitted by the to-be-adjusted wireless device at the adjusted transmit power is strong enough to cover an area between the to-be-adjusted wireless device and a layer of wireless devices closest to the to-be-adjusted wireless device, and is not strong enough to interfere with the neighbor wireless device. Optionally, using a WLAN as an example, the target power is −70 dBm. If the path loss is 75 dB, a power of an electromagnetic wave with a transmit power of 5 dBm is, after attenuating by 75 dB, −70 dBm. Therefore, the transmit power is 5 dBm.

Determining a proper reference wireless device is a key for reducing interference between wireless devices while ensuring a complete coverage area of a wireless signal. The reference wireless device in this application is related to the layer of wireless devices closest to the to-be-adjusted wireless device. For example, the reference wireless device is a wireless device in the middle of the layer of wireless devices closest to the to-be-adjusted wireless device, or the reference wireless device is a virtual wireless device in the middle of the layer of wireless devices closest to the to-be-adjusted wireless device.

Optionally, the wireless controller or the to-be-adjusted wireless device checks, according to ascending order of path losses between the multiple wireless devices and the to-be-adjusted wireless device, whether a stop condition is satisfied. The wireless controller or the to-be-adjusted wireless device adds a to-be-checked path loss into the neighbor path loss set, and stops checking a next path loss when the stop condition is satisfied. For example, the stop condition may be: stopping checking a next path loss when any one of the following two conditions is satisfied. Condition 1: A quantity of elements in the neighbor path loss set is two or more, and a difference between the to-be-checked path loss and an unchecked lowest path loss is greater than the first threshold. For example, the first threshold is 6 dB. Condition 2: A quantity of elements in the neighbor path loss set is equal to a second threshold. For example, if the quantity of wireless devices in the neighbor wireless device set is six at most, the second threshold is 6.

Using FIG. 1 as an example, a wireless device 103 adjusts a transmit power. The wireless device 103 obtains path losses of a wireless device 105, a wireless device 106, a wireless device 102, a wireless device 101, and a wireless device 104, which are 71 dB, 73 dB, 73 dB, 75 dB, and 83 dB, respectively. Differences of path losses between the wireless device 105, the wireless device 106, the wireless device 102, and the wireless device 101 are less than 6 dB. A difference between a path loss of the wireless device 104 and a path loss of the wireless device 105, the wireless device 106, the wireless device 102, or the wireless device 101 is at least 8 dB. Therefore, the neighbor path loss set is {71 dB, 73 dB, 73 dB, 75 dB}. The neighbor path loss is 73 dB.

For example, the wireless device 103 successively checks, in ascending order of path losses between the multiple wireless devices and the to-be-adjusted wireless device, whether the path losses (71 dB, 73 dB, 73 dB, 75 dB, and 83 dB) of the wireless device 105, the wireless device 106, the wireless device 102, the wireless device 101, and the wireless device 104 satisfy the stop condition. First, the wireless controller determines that the neighbor path loss set includes at least two elements, and therefore, the neighbor path loss set includes at least 71 dB and 73 dB. Then, differences of neighboring path losses are 0 dB, 2 dB, and 8 dB respectively, where 0 dB and 2 dB are less than 6 dB, and 8 dB is greater than 6 dB. Therefore, the neighbor path loss set is {71 dB, 73 dB, 73 dB, 75 dB}. The neighbor path loss is 73 dB.

Figure 3:
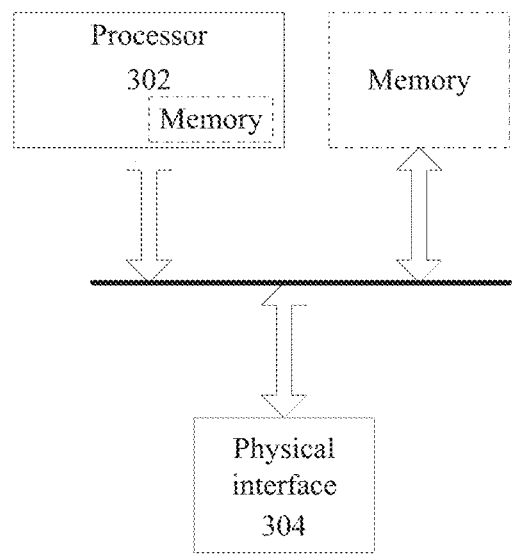
FIG. 3 is a structural diagram of a wireless controller according to an embodiment of the present invention.

FIG. 3 is a structural diagram of a wireless controller according to an embodiment of the present invention. The wireless controller may be a server or a network device.

The wireless controller includes a processor 302 and a physical interface 304. The processor 302 is connected to the physical interface 304. For example, the processor 302 may be connected to the physical interface 304 by using a bus.

The processor 302 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The physical interface 304 may be a wired physical interface, a wireless physical interface, or a combination thereof. The wired physical interface may be, for example, one or more Ethernet interfaces. The Ethernet interface may be an optical interface, an electrical interface, or a combination thereof. The wireless physical interface may be, for example, an antenna. The physical interface 304 is configured to communicate with a wireless device.

The wireless controller may further include a memory. The memory may be an independent device or may be integrated in the processor 302. The memory may include a volatile memory, for example, a random access memory (RAM). The memory may alternatively include a non-volatile memory, for example, a read-only memory (ROM), a flash memory, a compact disc, a magnetic tape, a floppy disk, a hard disk, or a solid state disk. The memory may further include any combination of the foregoing types of memories. The memory may be configured to store path losses between wireless devices. If the processor 302 includes a CPU, the memory may further store program code, and transmit the program code to the CPU, so that the CPU implements the embodiments of the present invention as instructed by the program code.

The processor 302 is configured to obtain a path loss between a to-be-adjusted wireless device and each of multiple wireless devices. The processor 302 is further configured to use the physical interface to instruct the to-be-adjusted wireless device to adjust a transmit power of the to-be-adjusted wireless device according to a neighbor path loss and a target power. The transmit power of the to-be-adjusted wireless device is, after attenuating according to the neighbor path loss, the target power.

For details about implementation of the processor 302, reference may be made to details about the transmit power control method shown in FIG. 2.

Figure 4:
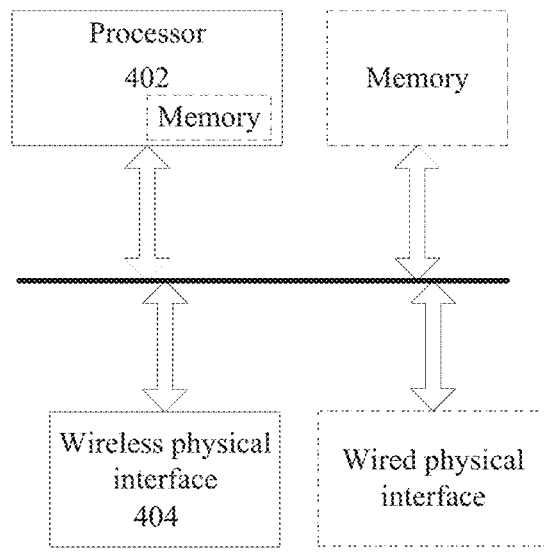
FIG. 4 is a structural diagram of a wireless device according to an embodiment of the present invention.

FIG. 4 is a structural diagram of a wireless device according to an embodiment of the present invention. The wireless device may be an access point, a base station, a Bluetooth base station, or the like.

The wireless device includes a processor 402 and a wireless physical interface 404. The processor 402 is connected to the wireless physical interface 404. For example, the processor 402 may be connected to the wireless physical interface 404 by using a bus.

The processor 402 may be a CPU, an NP, a hardware chip, or any combination thereof.

The wireless physical interface 404 may be an antenna. The wireless physical interface 404 is configured to receive a wireless signal.

The wireless device may further include a wired physical interface. The wired physical interface may be, for example, one or more Ethernet interfaces. The Ethernet interface may be an optical interface, an electrical interface, or a combination thereof.

The wireless device may further include a memory. The memory may be an independent device or may be integrated in the processor 402. The memory may include a volatile memory, a non-volatile memory, or a combination thereof. The memory may be configured to store path losses. If the processor 402 includes a CPU, the memory may further store program code, and transmit the program code to the CPU, so that the CPU implements the embodiments of the present invention as instructed by the program code.

The processor 402 is configured to use the wireless physical interface to measure strengths of signals from multiple wireless devices to obtain path losses between the wireless device and each of the multiple wireless devices. The processor 402 is further configured to adjust a transmit power of the wireless device according to a neighbor path loss and a target power. The transmit power of the wireless device is, after attenuating according to the neighbor path loss, the target power.

For details about implementation of the processor 402, reference may be made to details about the transmit power control method shown in FIG. 2.

Figure 5:
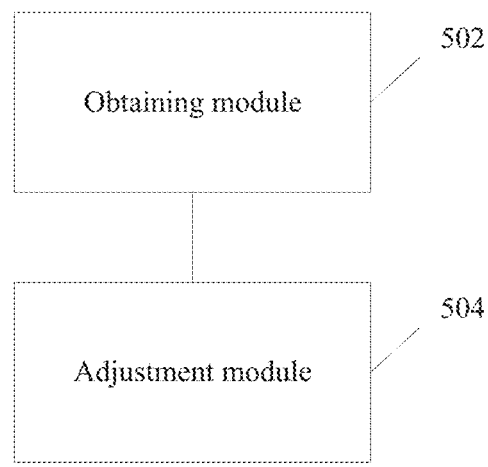
FIG. 5 is a structural diagram of a transmit power control device according to an embodiment of the present invention.

FIG. 5 is a structural diagram of a transmit power control device according to an embodiment of the present invention. The device includes an obtaining module 502 and an adjustment module 504.

The obtaining module 502 is configured to obtain a path loss between a to-be-adjusted wireless device and each of multiple wireless devices.

The adjustment module 504 is configured to adjust a transmit power of the to-be-adjusted wireless device according to a neighbor path loss and a target power, where the transmit power of the to-be-adjusted wireless device is, after attenuating according to the neighbor path loss, the target power.

For details about implementation of each module, reference may be made to details about the transmit power control method shown in FIG. 2.

A person of ordinary skill in the art may understand that all or some of the steps in the method embodiments may be completed by a processor instructed by a program. The program may be stored in a computer readable storage medium. The storage medium may be a random access memory, a read-only memory, a flash memory, a hard disk, a solid state disk, a magnetic tape, a floppy disk, a compact disc, or any combination thereof.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A transmit power control method, comprising:
   obtaining a path loss between a to-be-adjusted wireless device and each of multiple wireless devices; and
   adjusting a transmit power of the to-be-adjusted wireless device according to a neighbor path loss and a target power, wherein the transmit power of the to-be-adjusted wireless device is, after attenuating according to the neighbor path loss, the target power;
   wherein the neighbor path loss is a function of a neighbor path loss set, and wherein the neighbor path loss set is a set of path losses between the to-be-adjusted wireless device and wireless devices in a neighbor wireless device set; and
   wherein the neighbor wireless device set is a set of at least two wireless devices among the multiple wireless devices, wherein path losses between the at least two wireless devices and the to-be-adjusted wireless device are lowest, and wherein a difference between any two closest path losses other than a lowest path loss in the neighbor path loss set is less than or equal to a first threshold.

2. The method according to claim 1, wherein that the neighbor path loss is a function of a neighbor path loss set comprises:
   the neighbor path loss is an average of path losses in the neighbor path loss set.

3. The method according to claim 1, wherein that the neighbor path loss is a function of a neighbor path loss set comprises:
   the neighbor path loss is a median of path losses in the neighbor path loss set.

4. The method according to claim 1, wherein the method further comprises:
   checking, according to an ascending order of path losses of the multiple wireless devices, whether a stop condition is satisfied;
   adding a to-be-checked path loss into the neighbor path loss set; and
   stopping checking a next path loss when the stop condition is satisfied.

5. The method according to claim 4, wherein the stop condition comprises:
   a condition wherein a quantity of elements in the neighbor path loss set is two or more, and a difference between the to-be-checked path loss and an unchecked lowest path loss is greater than the first threshold.

6. The method according to claim 4, wherein the stop condition comprises:
   a condition wherein a quantity of elements in the neighbor path loss set is equal to a second threshold.

7. A wireless controller, comprising at least one processor and a physical interface, wherein the at least one processor is configured to:
   obtain a path loss between a to-be-adjusted wireless device and each of multiple wireless devices;
   instruct, using the physical interface, the to-be-adjusted wireless device to adjust a transmit power of the to-be-adjusted wireless device according to a neighbor path loss and a target power, wherein the transmit power of the to-be-adjusted wireless device is, after attenuating according to the neighbor path loss, the target power;
   wherein the neighbor path loss is a function of a neighbor path loss set, and wherein the neighbor path loss set is a set of path losses between the to-be-adjusted wireless device and wireless devices in a neighbor wireless device set; and
   wherein the neighbor wireless device set is a set of at least two wireless devices among the multiple wireless devices, wherein path losses between the at least two wireless devices and the to-be-adjusted wireless device are lowest, and wherein a difference between any two closest path losses other than a lowest path loss in the neighbor path loss set is less than or equal to a first threshold.

8. The wireless controller according to claim 7, wherein that the neighbor path loss is a function of a neighbor path loss set comprises:
the neighbor path loss is an average of path losses in the neighbor path loss set.

9. The wireless controller according to claim 7, wherein that the neighbor path loss is a function of a neighbor path loss set comprises:
the neighbor path loss is a median of path losses in the neighbor path loss set.

10. The wireless controller according to claim 7, wherein the at least one processor is configured to:
check, according to an ascending order of path losses of the multiple wireless devices, whether a stop condition is satisfied;
add a to-be-checked path loss into the neighbor path loss set; and
stop checking a next path loss when the stop condition is satisfied.

11. The wireless controller according to claim 10, wherein the stop condition comprises:
a condition wherein a quantity of elements in the neighbor path loss set is two or more, and a difference between the to-be-checked path loss and an unchecked lowest path loss is greater than the first threshold.

12. The wireless controller according to claim 10, wherein the stop condition comprises:
a condition wherein a quantity of elements in the neighbor path loss set is equal to a second threshold.

13. A wireless device, comprising at least one processor and a wireless physical interface, wherein the at least one processor is configured to:
measure, using the wireless physical interface, strengths of signals from multiple wireless devices to obtain a path loss between the wireless device and each of the multiple wireless devices; and
adjust a transmit power of the wireless device according to a neighbor path loss and a target power, wherein the transmit power of the wireless device is, after attenuating according to the neighbor path loss, the target power;
wherein the neighbor path loss is a function of a neighbor path loss set, and wherein the neighbor path loss set is a set of path losses between the wireless device and wireless devices in a neighbor wireless device set; and
wherein the neighbor wireless device set is a set of at least two wireless devices among the multiple wireless devices, wherein path losses between the at least two wireless devices and the wireless device are lowest, and wherein a difference between any two closest path losses other than a lowest path loss in the neighbor path loss set is less than or equal to a first threshold.

14. The wireless device according to claim 13, wherein that the neighbor path loss is a function of a neighbor path loss set comprises:
the neighbor path loss is an average of path losses in the neighbor path loss set.

15. The wireless device according to claim 13, wherein that the neighbor path loss is a function of a neighbor path loss set comprises:
the neighbor path loss is a median of path losses in the neighbor path loss set.

16. The wireless device according to claim 13, wherein the at least one processor is configured to:
check, according to ascending order of path losses of the multiple wireless devices, whether a stop condition is satisfied;
add a to-be-checked path loss into the neighbor path loss set; and
stop checking a next path loss when the stop condition is satisfied.

17. The wireless device according to claim 16, wherein the stop condition comprises:
a condition wherein a quantity of elements in the neighbor path loss set is two or more, and a difference between the to-be-checked path loss and an unchecked lowest path loss is greater than the first threshold.

18. The wireless device according to claim 16, wherein the stop condition comprises:
a condition wherein a quantity of elements in the neighbor path loss set is equal to a second threshold.

* * * * *